Figure 1:
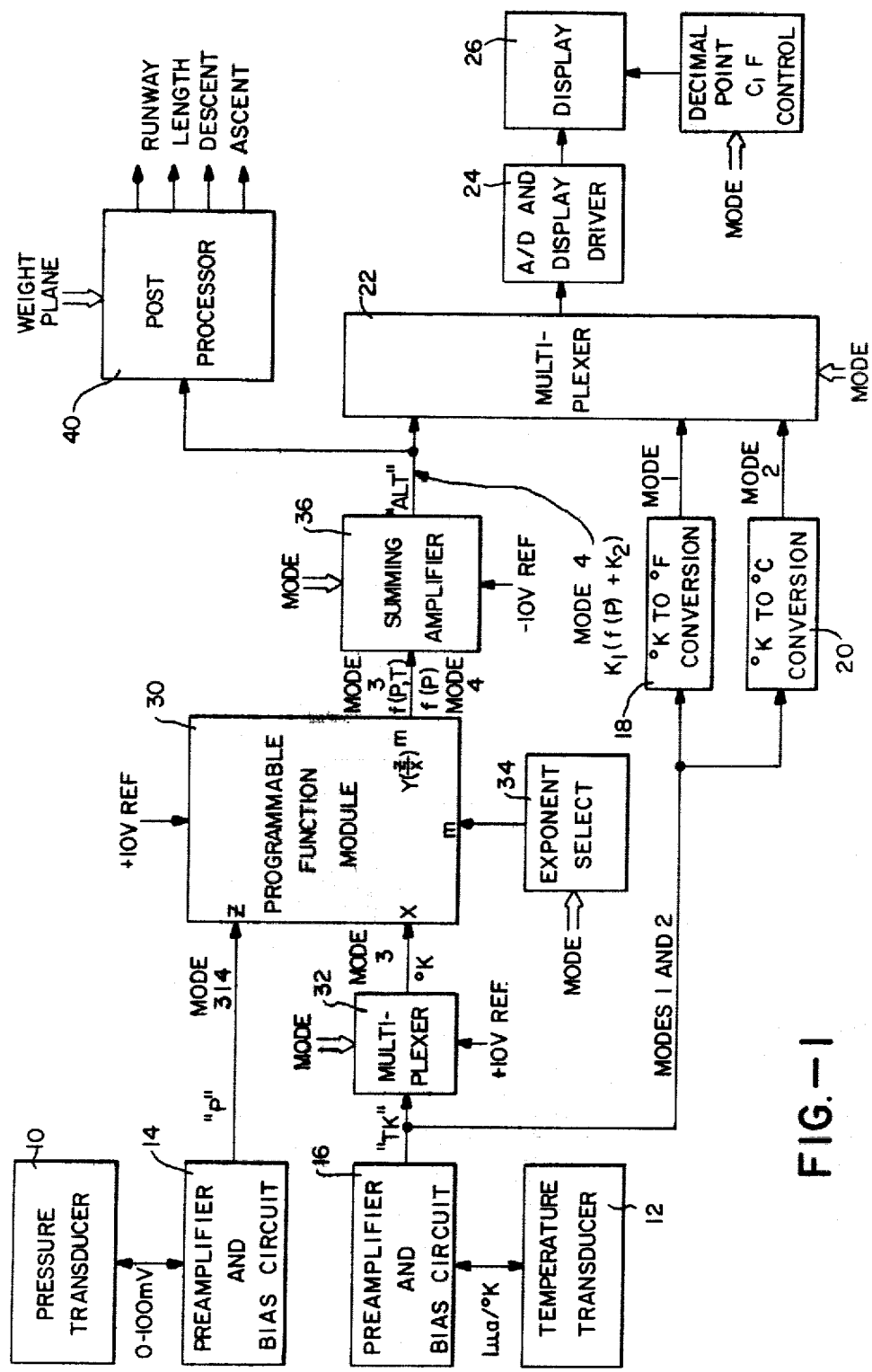

United States Patent [19]

Haase et al.

[11] 4,319,487
[45] Mar. 16, 1982

[54] BARO DATA INDICATOR

[75] Inventors: Wayne C. Haase, Mt. View, Calif.;
Dale J. Thompson, 1900
Embarcadero Rd., Palo Alto, Calif.
94303

[73] Assignee: Dale J. Thompson, Santa Clara, Calif.

[21] Appl. No.: 115,507

[22] Filed: Jan. 25, 1980

[51] Int. Cl.³ .............................................. G01L 7/00
[52] U.S. Cl. ..................................... 73/384; 73/178 T
[58] Field of Search ............. 73/384, 387, 386, 178 T;
364/433, 427, 428, 424, 556, 557, 558, 449;
116/DIG. 43

[56] References Cited

U.S. PATENT DOCUMENTS

| | | | |
|---|---|---|---|
| 3,135,861 | 6/1964 | Burggren et al. | 364/424 |
| 3,264,876 | 8/1966 | Bosch et al. | 73/386 |
| 3,761,693 | 9/1973 | Fleury | 364/424 |
| 3,843,877 | 10/1974 | Roselle et al. | 364/433 |
| 4,212,064 | 7/1980 | Forsythe et al. | 73/178 T |
| 4,224,669 | 9/1980 | Brame | 364/449 |

Primary Examiner—Donald O. Woodiel
Attorney, Agent, or Firm—Flehr, Hohbach, Test

[57] ABSTRACT

Avionics apparatus for providing to a pilot readings of temperature, pressure altitude, and density altitude. Sensors provide electrical signals responsive to ambient temperature and pressure, and a functional module operates on signals derived from said sensors to provide signals indicative of the pressure altitude and density altitude. A multiplexer and display respond to a mode selection switch to provide visual readouts of temperature in degrees Fahrenheit and in degrees Celsius, and altitude.

9 Claims, 9 Drawing Figures

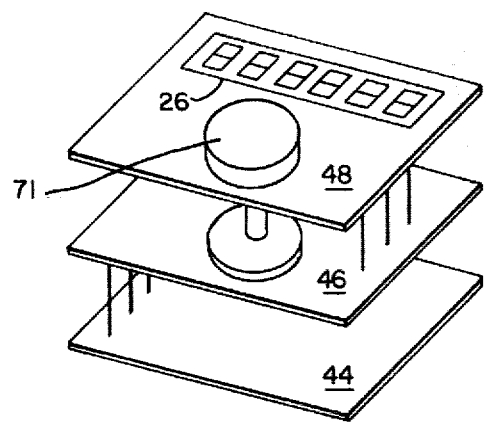
FIG.—2
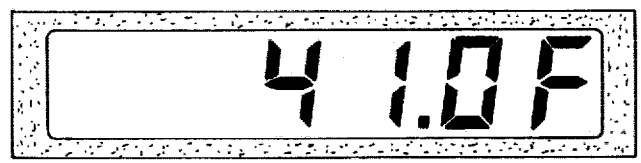
FIG.—3A
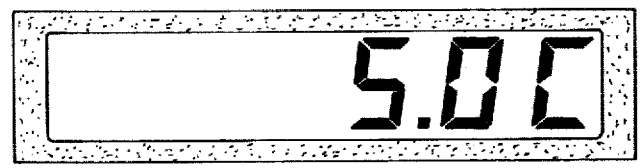
FIG.—3B
FIG.—3C
FIG.—3D

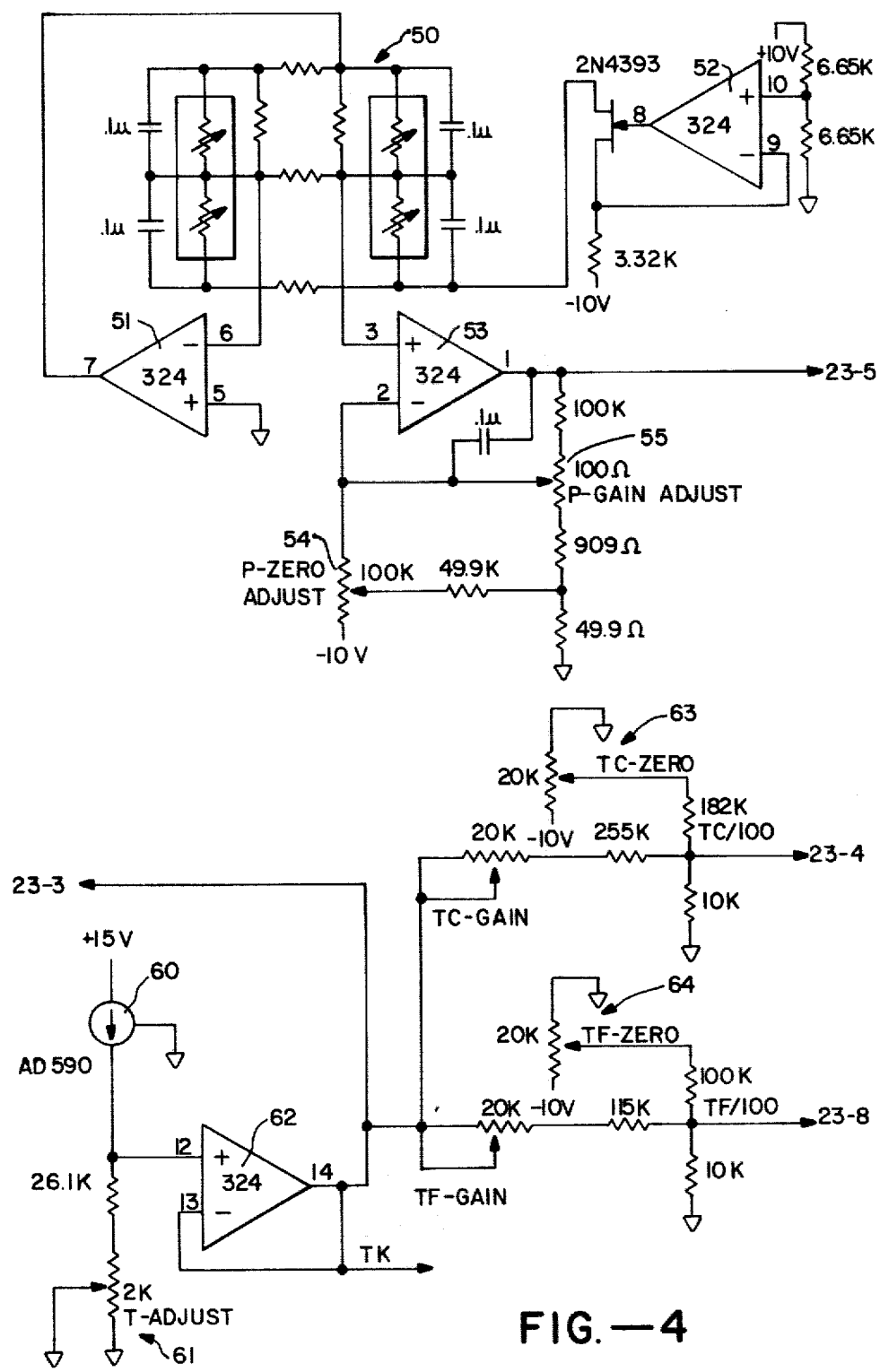
FIG.—4

BARO DATA INDICATOR

This invention relates generally to avionics apparatus, and more particularly the invention relates to apparatus for facilitating the determination of aircraft performance criteria based on the combined effects of ambient temperature and pressure measurements.

Conventional avionics apparatus includes separate ambient pressure and temperature sensors. Typically, an altimeter is provided which senses static or ambient pressure and provides an indicated altitude readout calibrated in hundreds, thousands and ten-thousands of feet. Standard sea level pressure is defined as 29.92 inches of mercury or 1013.25 millibars, and the operation of the altimeter is based on this standard pressure. When the altimeter baro-set is set to this standard sea level pressure, the readout is called "pressure altitude." The altimeter can be adjusted or set to correct for changes in local barometric pressure also. Thus, an "indicated altitude" is read when the altimeter is set to the local barometric pressure. After an aircraft takes off and begins climbing, the atmospheric pressure decreases and the increased altitude is read out. The indicated altitude will correspond to pressure altitude only when the local pressure corresponds to the standard pressure, 29.92 inches of mercury or 1013.25 millibars. Also, typically, a temperature sensing probe is provided, usually a direct-reading twisted bi-metal type, mounted in the windshield for the purpose of reading outside air temperature (OAT) in degrees F. or degrees C.

Aircraft performance is dictated by the density of the ambient air, and air density is dependent on both altitude and ambient temperature. "Density altitude" is the pressure altitude modified by local ambient temperature. Conventionally, density altitude is established by first adjusting the altimeter to standard sea level pressure (i.e., 29.92 inches of mercury or 1013.25 millibars) and reading the pressure altitude. Then, conversion charts based on pressure altitude and ambient temperature (called outside air temperature or OAT) are referenced to provide the corresponding density altitude.

Density altitude is necessary in calculating true air speed (TAS), and importantly, in calculating runway length for a high temperature and/or high altitude takeoff or landing. The flight manual for a particular aircraft gives charts or tables for takeoff and landing distances at various density altitudes and for various aircraft loads.

The necessity for adjusting the altimeter from local barometric pressure to standard pressure in order to determine pressure altitude, next determining density altitude from a flight manual based on pressure altitude and temperature, and finally determining takeoff distance from the density altitude and known aircraft load often leads to erroneous calculations and possible disastrous consequences, especially in high altitude and/or high temperature environments.

Accordingly, an object of the present invention is avionics apparatus for facilitating aircraft performance calculations.

Still another object of the invention is avionics apparatus having multiple modes of operation. Briefly, apparatus in accordance with the invention includes pressure means for measuring ambient pressure and providing an electrical signal indicative of pressure; temperature means for measuring temperature and providing an electrical signal indicative of temperature; and altitude means for receiving the electrical signal indicating pressure and the electrical signal indicating temperature and providing therefrom a measure of pressure altitude and a measure of density altitude. Mode selection means is provided for selectively providing the pressure altitude and density altitude outputs. In addition, display means including a multiplexer receives the electrical signals and output signals and selectively provides a display of temperature in degrees Fahrenheit and in degrees Celsius, pressure altitude, and density altitude, one at a time.

More particularly, the altitude means responds to the pressure signals and provides a pressure altitude signal in accordance with the following equation:

$$Z = Z_o \left[ 1 - \left( \frac{P}{P_o} \right)^{\frac{1}{n}} \right]$$

Pressure altitude combined with a temperature signal from the temperature means provides a density altitude signal in accordance with the following equation:

$$Z_\rho = Z_o \left[ 1 - \left( \frac{PT_o}{P_o T} \right)^{\frac{1}{n-1}} \right]$$

where
$P_o = 29.92$ in. Hg $= 2116.22$ lb/ft$^2 = 1013.25$ millibars
$P =$ measured pressure
$Z_o = 145367$ ft $= 44,308$ meters
$n = 5.2568$
$T_o = 59°$ F. $= 15°$ C. $= 288.18°$ K. $=$ standard ICAO atmospheric temperature
$T =$ measured temperature (absolute) The apparatus can be employed with additional processor means to give a direct indication of runway length for takeoff and landing, and vertical speed indication, for example.

The invention and objects and features thereof will be more readily apparent from the following detailed description and appended claims when taken with the drawings in which FIG. 1 is a functional block diagram of apparatus in accordance with the present invention.

FIG. 2 is a perspective view of a unit module of the apparatus of FIG. 1 in accordance with one embodiment of the invention.

FIGS. 3A–3D views of a display readout illustrating modes of operation of the apparatus in accordance with the invention.

Figure 5:
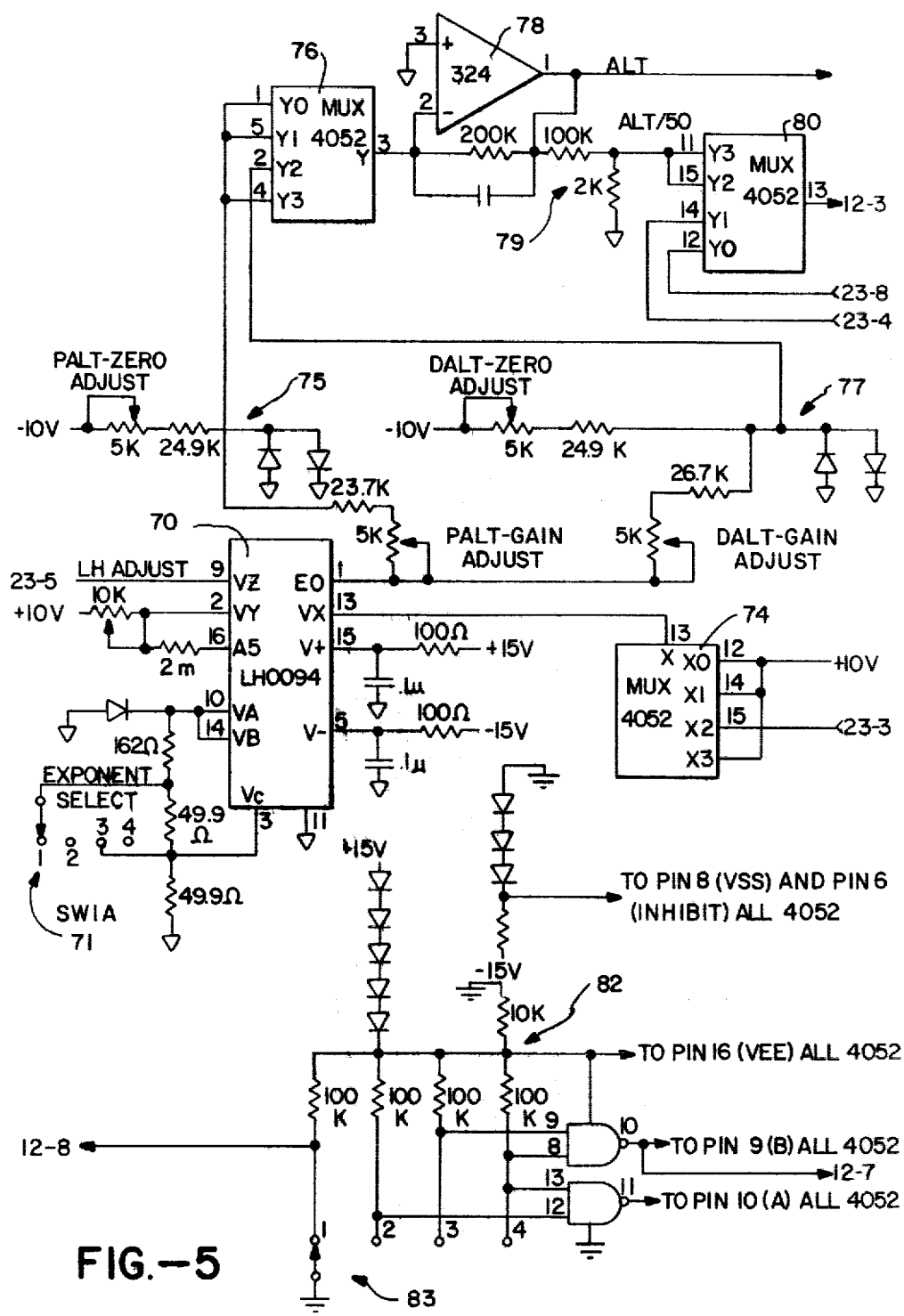
Figure 6:
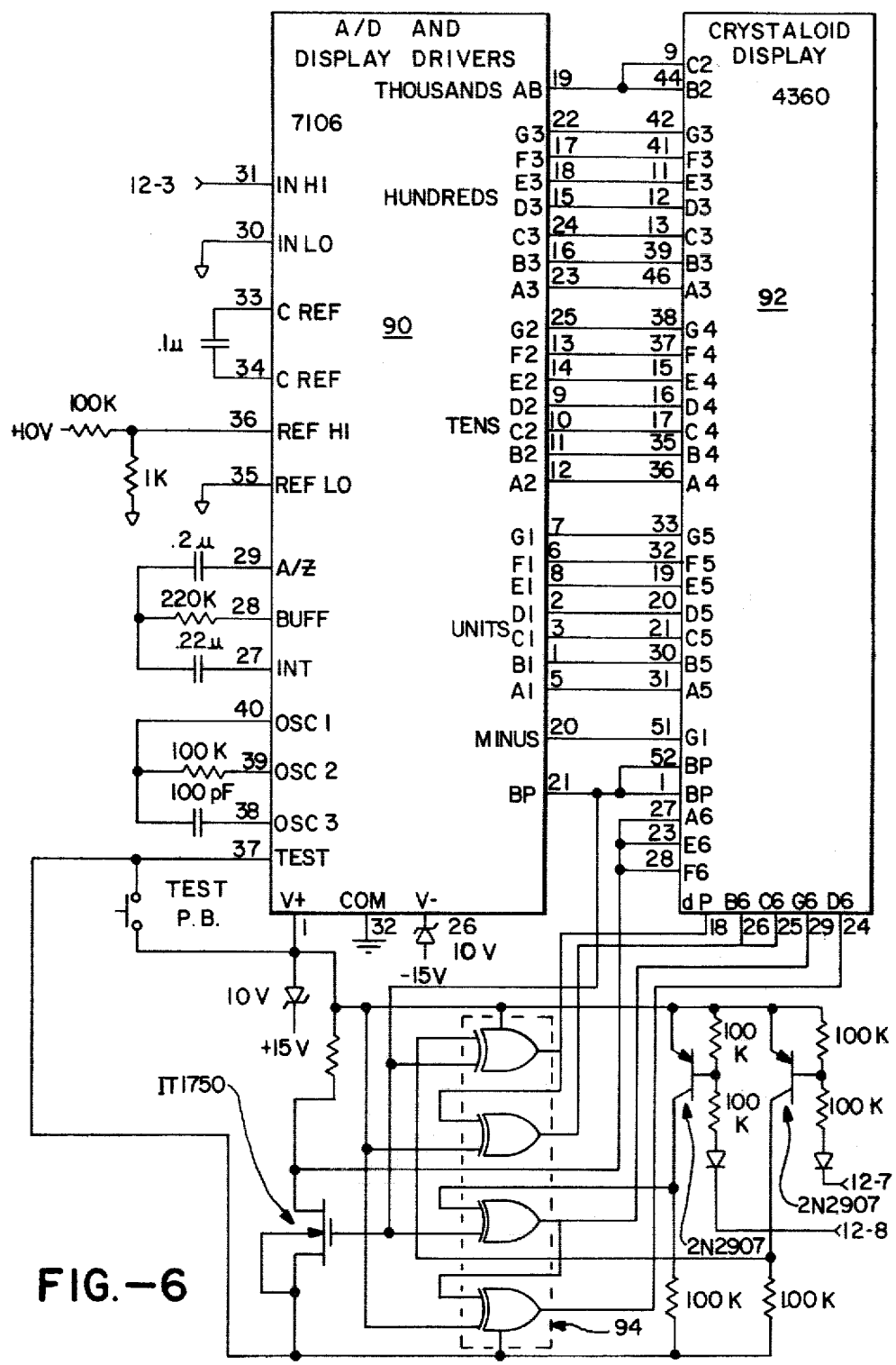

FIGS. 4–6 are detailed schematics in accordance with one embodiment of the present invention.

Referring now to the drawings, FIG. 1 is a functional block diagram illustrating one embodiment of the invention. The apparatus includes a pressure transducer 10 and a temperature transducer 12 which respond to ambient conditions and generate electrical signals indicative thereof. For example, a commercially available Foxboro 1800A pressure transducer will generate an electrical signal between 0 and 100 millivolts and a conventional temperature transducer such as the Analog Devices AD 590 generates an electrical signal of one microamp per degree Kelvin.

The voltage signal from pressure transducer 10 is applied to preamplifier and bias circuitry 14 which generates an adjusted output voltage more suitable for processing. In preferred embodiments, the output signal from the circuitry 14 is a voltage from 0 to 10 volts corresponding to the pressure transducer signal from 0 to 100 millivolts. Similarly, preamplifier bias circuitry 16 receives the signal from temperature transducer 12 and generates an output voltage from 0 to 10 volts corresponding to the temperature transducer output signal.

In a preferred embodiment, the apparatus has four modes of operation: namely, temperature in degrees Fahrenheit, temperature in degrees Celsius, density altitude, and pressure altitude. A mode switch 71 is included so that only one readout of the four modes can be selected at a time. In deriving the first two modes of operation, the output signal from preamplifier bias circuit 16, which corresponds to degree Kelvin, is applied to converters 18 and 20 which convert the signal from degrees Kelvin to degrees Fahrenheit and degrees Celsius, respectively. The outputs from converters 18 and 20 are then applied through multiplexer 22 to an analog to digital converter and display driver 24 and thence to display 26 where temperature in accordance with mode 1 and mode 2 of operation is displayed. As will be described further hereinbelow, a mode switch controls multiplexer 22 and also provides a decimal point and either Celsius or Fahrenheit designation for display 26.

In mode 3 and 4 of operation, the pressure signal from circuitry 14 is applied to a programmable function module 30 along with an input from multiplexer 32. Multiplexer 32 is controlled by the mode switch whereby the temperature signal from circuitry 16 is applied to the programmable function module 30 in the mode 3 operation for deriving density altitude, and multiplexer 32 applies a reference voltage (e.g., +10 volts) for mode 4 operation in deriving pressure altitude. The mode switch also controls the exponent selection for module 30. The programmed module 30, such as a National Semiconductor LH0094 device, is programmed to operate on the input signals to give an output signal which is a function of both pressure and temperature in mode 3 and which is a function of pressure only in mode 4. The signals from module 30 are then applied to a summing amplifier 36 which operates on the signals from module 30 to provide output signals in accordance with the following equations:

$$\text{Pressure altitude } (Z) = Z_o \left[ 1 - \left( \frac{P}{P_o} \right)^{\frac{1}{n}} \right]$$

$$\text{Density altitude } (Z_p) = Z_o \left[ 1 - \left( \frac{PT_o}{P_oT} \right)^{\frac{1}{n-1}} \right]$$

The elements of the equations are given hereinabove, and the equations assume an ideal gas law and dry air.

The output signal from summing amplifier 36 is applied to multiplexer 22 and in response to the mode selection switch is passed to the display driver 24 and to display 26.

In addition, the pressure altitude and density altitude signals can be applied to a processor 40 along with specific aircraft criteria and other inputs such as load of the aircraft whereby a direct reading of runway length, hover capacity (for helicopters) and the like are provided.

Thus, a pilot preparing for takeoff need only select the proper mode of the apparatus to obtain density altitude without the necessity for adjusting the pressure setting of the altimeter to obtain pressure altitude and then referring to charts to obtain density altitude from pressure altitude and ambient temperature, as in conventional practice. Consequently, the pilot's procedures in takeoff and landing are simplified, and errors in obtaining density altitude and attendant information, such as runway length, are minimized.

Apparatus in accordance with the present invention can be readily packaged in a compact assembly for cockpit mounting. FIG. 2 is a perspective view of one embodiment of the apparatus which has been assembled on three printed circuit boards measuring 2.250 inches by 2.250 inches and which are stacked in array measuring 4.0 in depth. As will be described further hereinbelow, the preamplifier and bias circuitry and temperature conversion circuitry are mounted on board 44, the programmable function module, multiplexer, and mode switch are mounted on board 46, and the display driver and display are mounted on board 48.

In one embodiment a liquid crystal display having six 7-segment units and a decimal point was employed. FIG. 3A illustrates the display in mode 1 with an illustrative readout of 41.0 degrees Fahrenheit. In FIG. 3B, the mode 2 operation is illustrated in which the corresponding Celsius readout is 5.0° C. In mode 3 operation, as illustrated in FIG. 3C, a density altitude of 3750 feet is displayed, while in FIG. 3D the corresponding pressure altitude of 4000 feet is illustrated.

A detailed schematic of one embodiment of the apparatus of FIG. 1 is shown in FIGS. 4,5,6 which correspond to boards 44, 46 and 48, respectively, of FIG. 2.

In FIG. 4, a pressure transducer shown generally at 50 comprising a silicon resistor bridge network such as a Foxboro 1800A transducer is interconnected between bias circuitry comprising differential amplifier 51 and differential amplifier 52, with the output of the bridge circuitry applied to differential amplifier 53 which provides an output signal from 0 to 10 volts corresponding to a pressure transducer signal from 0 to 100 millivolts. Potentiometer 54 provides a pressure zero adjust and potentiometer 55 provides a pressure gain adjust.

The temperature transducer 60 is serially connected with a resistive network including a temperature adjust potentiometer 61 and generates an electrical signal of one microampere per degree Kelvin which is applied to a differential amplifier 62. The output of amplifier 62 is a signal indicative of temperature in degrees Kelvin which is applied to the resistive network shown generally at 63 which converts the signal in degrees Kelvin to a signal in degrees Celsius. Similarly, the output signal from amplifier 62 is applied to the resistive network 64 which converts the signal from degrees Kelvin to a signal in degrees Fahrenheit, as indicated. In addition, the signal from amplifier 62 is applied to the multiplexer 32 of FIG. 1 which is mounted on the borad 46 of FIG. 2.

FIG. 5 is an electrical schematic of the board 46 of FIG. 2 which includes the programmable functional module 70 in which terminal 9 receives the pressure output signal from amplifier 53 of FIG. 4, and in which the exponent select is determined by the mode switch 71 which controls the inputs to terminal 10, 14, and 3 of module 30 through the voltage divider network shown generally at 72. Multiplexer 74 (which corresponds to multiplexer 32 of FIG. 1) receives the temperature signal from amplifier 62 of FIG. 4 and a reference voltage (+10 volts) and in response to the mode switch applies an input to terminal 13 of module 70. Module 70 acts on the inputs as above described and provides output signals at terminal 1 which is a function of pressure and temperature (mode 3 operation) or a function of pressure alone (mode 4 operation). The output signal is applied through biasing circuitry shown generally at 75 which adjusts the mode 4 signal for application to multiplexer 76. Similarly, the output signal is applied through the biasing circuitry 77 which adjusts the mode 3 signal which is then applied also to multiplexer 76. Multiplexer 76 responds to the mode switch and selectively applied signals from biasing circuitry 75, 77 to a summing amplifier 78. The output from summing amplifier 78 is applied through a voltage divider shown generally at 79 to provide an "altitude/50" signal. The "ALT/50" signal from summing amplifier 78 is applied along with the temperature signals through multiplexer 80 to the display driver circuitry.

Also mounted on board 46 is the multiplexer control circuitry shown generally at 82 which responds to the setting of mode switch 83 and provides control signals to the multiplexers as indicated. FIG. 6 is a schematic of the circuitry on board 48 of FIG. 2 and includes an A to D converter and display driver unit 90 such as an Intersil 7106 device. The display driver 90 is biased as illustrated with pin 31 receiving the output of multiplexer 80 of FIG. 5. Multiplexer 80 corresponds to multiplexer 22 of FIG. 1. The outputs from driver 90 are connected to the inputs of a liquid crystal display 92, for instance, a Crystaloid 4360 LCD with the logic circuitry shown generally at 94 providing the decimal point, Celsius, Fahrenheit and negative designations, when applicable.

Apparatus in accordance with the present invention has simplified the procedures of a pilot in calculating the performance characteristics of his aircraft. The embodiment of the invention illustrated schematically in FIGS. 4-6 has been embodied in the compact module shown perspectively in FIG. 2. However, the embodiment is illustrative of the invention and is not to be construed as limiting the invention. Various modifications and applications will occur to those skilled in the art without departing from the true spirit and scope of the invention as defined by the appended claims.

What is claimed is:

1. Apparatus comprising
pressure means for measuring ambient pressure and providing an electrical signal indicative of pressure, P,
temperature means for measuring temperature and providing an electrical signal indicative of temperature, T,
altitude means for receiving said electrical signal indicating pressure, P, and said electrical signal indicating temperature, T, and including mode selection means for selectively providing output signals indicating pressure altitude in accordance with $$Z = Z_o\left[1 - \left(\frac{P}{P_o}\right)^{\frac{1}{n}}\right]$$

and a density altitude in accordance with $$Z_\rho = Z_o\left[1 - \left(\frac{PT_o}{P_oT}\right)^{\frac{1}{n-1}}\right]$$

where $Z_o$, n, $P_o$ and $T_o$ are constants, and means interconnecting said pressure means and said temperature means with said altitude means for transferring said electrical signals to said altitude means.

2. Apparatus as defined by claim 1 and further including display means and multiplex means for receiving said electrical signal indicative of pressure, said electrical signal indicative of temperature and said output signals, said display means selectively providing a display of temperature and altitude in response to inputs from said multiplex means.

3. Apparatus as defined by claim 1 wherein said pressure means comprises a pressure transducer responsive to pressure in generating a first electrical signal and preamplification and biasing means for operating on said first electrical signal, said temperature means comprises a temperature transducer for generating a second electrical signal in response to temperature and preamplification and biasing means for operating on said second electrical signal, and said altitude means comprises a function module responsive to said mode selection means and generating a first electrical signal indicative of pressure altitude and a second electrical signal indication of density altitude.

4. Apparatus as defined by claim 1 wherein said mode select means is connected to said altitude means and said multiplex means whereby said display includes mode for temperature in degrees Fahrenheit, temperature in degrees Celsius, density altitude, and pressure altitude.

5. Apparatus as defined by claim 3 or 4 and including a stacked array of three circuit boards, a first of said boards including said preamplification and biasing means, a second of said boards including said altitude means and said multiplex means, and a third of said boards including said display means.

6. Avionics apparatus for displaying readouts of temperature and altitude comprising
pressure transducer means responsive to ambient pressure and generating a pressure electrical signal,
temperature transducer means responsive to ambient temperature and generating a temperature electrical signal,
first preamplifier and bias circuitry for receiving said pressure electrical signal and generating an adjusted pressure electrical signal,
second preamplifier and bias circuitry for receiving said temperature electrical signal and generating an adjusted temperature electrical signal,
conversion means for receiving said adjusted temperature electrical signal and generating a converted temperature electrical signal,
mode selection means for selecting a mode of operation of said avionics apparatus,
a function module means,
means responsive to said mode selection means for applying said adjusted temperature electrical signal and said adjusted pressure electrical signal to said function module means,
said function module means being responsive to said mode selection means and generating a first electrical signal as a function of said adjusted pressure signal and generating a second electrical signal as a function of said adjusted temperature electrical signal and of said adjusted pressure electrical signal, multiplexer means, means for applying said converted temperature electrical signal, said first electrical signal, and said second electrical signal to said multiplexer means, display means, and means connecting said multiplexer to said display means whereby said display means selectively displays temperature and altitude in response to said mode selection means.

7. Avionics apparatus as defined by claim 6 wherein said function module means provides a pressure altitude signal in accordance with $$Z = Z_o \left[ 1 - \left( \frac{P}{P_o} \right)^{\frac{1}{n}} \right]$$

and a density altitude signal in accordance with $$Z_p = Z_o \left[ 1 - \left( \frac{PT_o}{P_o T} \right)^{\frac{1}{n-1}} \right]$$

where $Z$ = pressure altitude
$Z_p$ = density altitude
$P$ = ambient pressure
$T$ = ambient temperature and $Z_o$, n, $P_o$ and $T_o$ are constants.

8. Avionics apparatus as defined by claim 7 wherein said conversion means receives an adjusted electrical signal indicative of temperature in degrees Kelvin and produces an electrical signal indicative of temperature in degrees Fahrenheit and an electrical signal indicative of temperature in degrees Celsius.

9. Avionics apparatus as defined in claim 8 wherein said mode selection means selects a temperature mode in degrees Fahrenheit, a temperature mode in degrees Celsius, a density altitude mode, and a pressure altitude mode.

* * * * *